US006301609B1

(12) United States Patent
Aravamudan et al.

(10) Patent No.: US 6,301,609 B1
(45) Date of Patent: Oct. 9, 2001

(54) ASSIGNABLE ASSOCIATE PRIORITIES FOR USER-DEFINABLE INSTANT MESSAGING BUDDY GROUPS

(75) Inventors: Murali Aravamudan, Murray Hill; Robert F. Henrick, Basking Ridge; Rangamani Sundar, Freehold; Gregory James Xikes, Chatham, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,937

(22) Filed: Sep. 8, 1999

Related U.S. Application Data

(60) Provisional application No. 60/142,597, filed on Jul. 7, 1999, and provisional application No. 60/142,598, filed on Jul. 7, 1999.

(51) Int. Cl.⁷ .................................................... G06F 15/16

(52) U.S. Cl. ......................... 709/207; 709/204; 709/202; 709/206; 707/1

(58) Field of Search .................................... 709/206, 207, 709/204, 202, 205; 707/1, 509, 513, 9, 154

(56) References Cited

U.S. PATENT DOCUMENTS

| | | | | |
|---|---|---|---|---|
| 5,592,622 | * | 1/1997 | Isfeld et al. | 709/207 |
| 5,774,668 | * | 6/1998 | Choquier et al. | 709/223 |
| 5,796,633 | * | 8/1998 | Burgess et al. | 702/187 |
| 5,826,269 | * | 10/1998 | Hussey | 707/10 |
| 5,872,926 | * | 2/1999 | Levac et al. | 709/206 |
| 5,884,032 | * | 3/1999 | Bateman et al. | 709/204 |
| 5,924,116 | * | 7/1999 | Aggarwal et al. | 711/122 |
| 5,951,638 | * | 9/1999 | Hoss et al. | 709/206 |
| 5,974,446 | * | 10/1999 | Sonnenreich et al. | 709/204 |
| 5,999,932 | * | 12/1999 | Paul | 707/10 |
| 5,999,966 | * | 12/1999 | McDougall et al. | 709/204 |

* cited by examiner

*Primary Examiner*—Robert B. Harrell
*Assistant Examiner*—William C. Vaughn, Jr.
(74) *Attorney, Agent, or Firm*—Guy H. Eriksen

(57) ABSTRACT

A unified messaging solution and services platform is provided by utilizing the features and capabilities associated with instant messaging to locate a registered user, query the user for a proposed message disposition, and coordinate services among a plurality of communication devices, modes, and channels. A user proxy is registered to the user as a personal communication services platform. The user is able to define various rules for responding to received data and communications, the rules stored within a rules database servicing the communication services platform. Instant messaging is used for communications between the user and the communication services platform's user proxy.

12 Claims, 8 Drawing Sheets

COMMUNICATION SERVICES PLATFORM
160
168
PERSONAL DATA AND RULES
OTHER DATA
170
SERVICES LOGIC
166
SERVICES EXECUTIVE
164
NETWORK SERVICES INTERFACE
162
120
SERVICE PROVIDER
SOFTSWITCH
128
INSTANT MESSAGE SERVER
130
PACKET
122
PSTN
124
GATEWAY
126
INFORMATION RETRIEVAL
134
INCOMING COMMUNICATION
132
CLIENT
140
142
144
146
148
150

COMMUNICATION SERVICES PLATFORM
160
168
PERSONAL DATA AND RULES
170
OTHER DATA
166
SERVICES LOGIC
164
SERVICES EXECUTIVE
162
NETWORK SERVICES INTERFACE
130
INSTANT MESSAGE SERVER
120
SERVICE PROVIDER
128
SOFTSWITCH
122
PACKET
124
PSTN
126
GATEWAY
134
INFORMATION RETRIEVAL
132
INCOMING COMMUNICATION
140
CPE
142
144
146
148
150

184
180
SS7
STM SWITCH
182
186
SS7 → H.323/SIP GATEWAY
192
188
SOFTSWITCH
190
190
190
190
190

USER SELECTS SERVICE
202
DOWNLOAD CLIENT S/W
204
REGISTERS NAME AND PASSWORD
206
208
REGISTER ADDRESS AND ASSIGNS ID
SERVER → CSP
• ADDRESS
• PASSWORD
210
212
CSP CREATES PERSONAL DATABASE
CSP → IM SERVER CREATE USER ACCOUNT
214
IM SERVER INITIATES BUDDY GROUP
1.) CSP
2.) USER
216

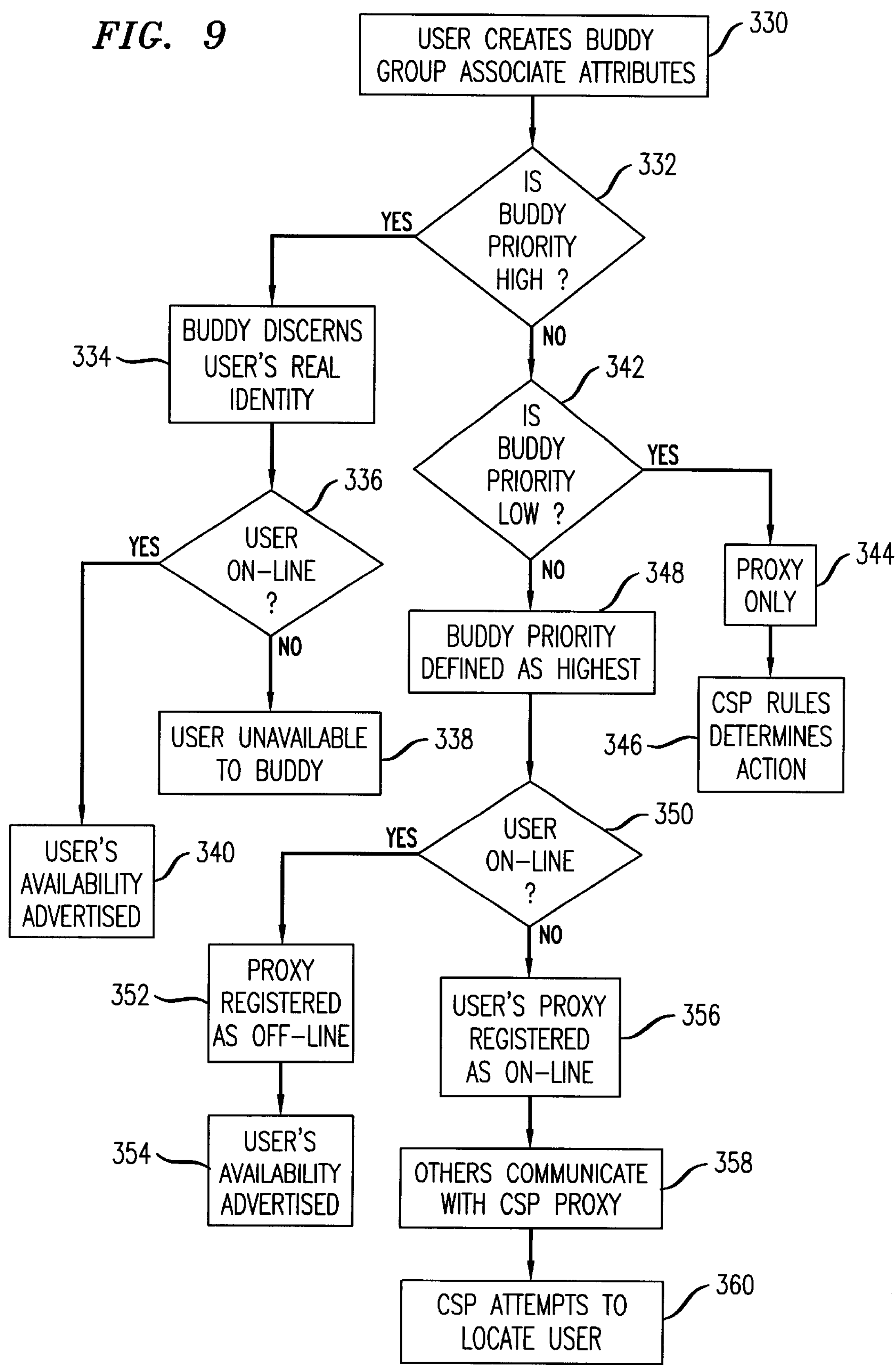
FIG. 9
USER CREATES BUDDY GROUP ASSOCIATE ATTRIBUTES
330
IS BUDDY PRIORITY HIGH ?
332
YES
NO
BUDDY DISCERNS USER'S REAL IDENTITY
334
USER ON-LINE ?
336
YES
NO
USER UNAVAILABLE TO BUDDY
338
USER'S AVAILABILITY ADVERTISED
340
IS BUDDY PRIORITY LOW ?
342
YES
NO
PROXY ONLY
344
CSP RULES DETERMINES ACTION
346
BUDDY PRIORITY DEFINED AS HIGHEST
348
USER ON-LINE ?
350
YES
NO
PROXY REGISTERED AS OFF-LINE
352
USER'S AVAILABILITY ADVERTISED
354
USER'S PROXY REGISTERED AS ON-LINE
356
OTHERS COMMUNICATE WITH CSP PROXY
358
CSP ATTEMPTS TO LOCATE USER
360

ASSIGNABLE ASSOCIATE PRIORITIES FOR USER-DEFINABLE INSTANT MESSAGING BUDDY GROUPS

CROSS REFERENCES TO RELATED APPLICATIONS

This application claims the benefit of U.S. Provisional Application No. 60/142,597, filed on Jul. 7, 1999. This application is related to another U.S. Patent Application having a filing date of Sep. 8, 1999, which claims the benefit of U.S. Provisional Application No. 60/142,598 filed on Jul. 7, 1999, entitled "Communication Services Platform with Integrated Instant Messaging Capabilities" (Aravamudam 15-4-1-1), and having common assignees.

FIELD OF THE INVENTION

The present invention relates to the use of instant messaging in conjunction with access to data and communication network channels and modes.

BACKGROUND OF THE INVENTION

Recent advances and developments in packet networks, consumer premises equipment, network servers, and client software provide a synergistic environment for the development of new communication modes and complexities. Packet networks, including private intranets and the Internet, are becoming ubiquitous features of the public and private telecommunications infrastructures. Client premises equipment includes such disparate device types as personal computers, cable modems, screen phones and personnel digital assistants, which singly and collectively enable a richer and more robust user interaction and interface via screens, input devices, and multimedia capabilities. E-mail is now a standard form of communication and information exchange. Telephony via the personal computer and shared collaboration are widely accepted and utilization of these modes are growing daily. A new form of communication, instant messaging, is also becoming prevalent as a private extension to chat groups and is in use by over ten million people today. Instant messaging allows end users to select "buddies" and assign these buddies to "buddy groups," automatically register a person when on-line, advertise the user's selected buddies to the user when the selected buddies register on-line, advertise the user's presence on-line to others who have selected the user as a buddy, and participate in instant messaging communication between two on-line users.

Many developers provide proprietary software for enabling instant messaging between on-line users, including but not limited to America Online, General Magic, Inc., and Mirabilis. Standards are currently being developed to develop a uniform protocol for packaging and transporting instant messages. Such standardization will only serve to act as a catalyst to spur greater instant messaging use, new standard network servers, and new and improved client software.

Historically, each of the communication modes and channels have been disparate and disjoint in nature. For example, Public Switched Telephone Network (PSTN) voice communications were not compatible nor interconnected with e-mail communications, which in turn were not compatible nor interconnected with wireless communications. Typically, each separate communication or data channel and mode maintained its own client message/data storage and retrieval mechanism. For instance, separate mailboxes were maintained for PSTN voice messages, wireless voice messages, e-mail messages. However, there is currently a remarkable flurry of interest and activity in providing a unified messaging solution, typically proposed as having a single storage repository or mailbox for a plurality of message/data modes and channels. Single number location solutions now provide users such services as notification when critical e-mail is received, text to speech conversion of e-mail when it is desired to receive a written e-mail over a user's wired or wireless phone, and the ability to aggregate incoming communications at a single location. These and other unified messaging solutions offer a user a powerful synergistic combination of communication, convenience, simplicity of use, services, and features. Key in providing such a unified messaging solution is the ability to locate a user, communicate from the service to the user, offer a selection of communication options to the user, and solicit responses from the user regarding those communication option choices. Unfortunately, a truly unified messaging solution which is able to accomplish each of these tasks, irrespective of the channel, mode, and CPE device which the user may be using, has not yet been fully realized.

SUMMARY OF THE INVENTION

A unified messaging solution and services platform is provided by utilizing the unique features and capabilities associated with existing and emerging instant messaging services and communication protocols to locate a registered user, query the user for a proposed message disposition or other action, and coordinate services among a plurality of communication devices, modes, and channels. A user proxy is registered to the user with an instant messaging system as a personal communication services platform. The user creates buddy groups and defines specific attributes to associates (buddies) included within each group. Included within each associate definition is a user-selected priority assignment. One exemplary embodiment of the present invention allows selection of one of three priority assignments: low, high, and highest. If an associate is assigned a low priority by the user, the associate will never discern whether the user is online or offline, instead the associate will always communicate and interact with the user via the user proxy. If however, the associate is assigned a high priority by the user, the associate will discern the users online status any time he is registered as online. Associates assigned the highest priority by the user, are able to interface with the user directly when the user is online, and interface with the user proxy when the user is offline.

BRIEF DESCRIPTION OF THE DRAWINGS

A more complete understanding of the present invention may be obtained from consideration of the following description in conjunction with the drawings in which:

FIG. 9 is a flow diagram of an exemplary method for maintaining a continuous user network presence for defined buddies utilizing a Communication Services Platform (CSP) and instant messaging, in accordance with the principles of the present invention.

DETAILED DESCRIPTION

Figure 1:
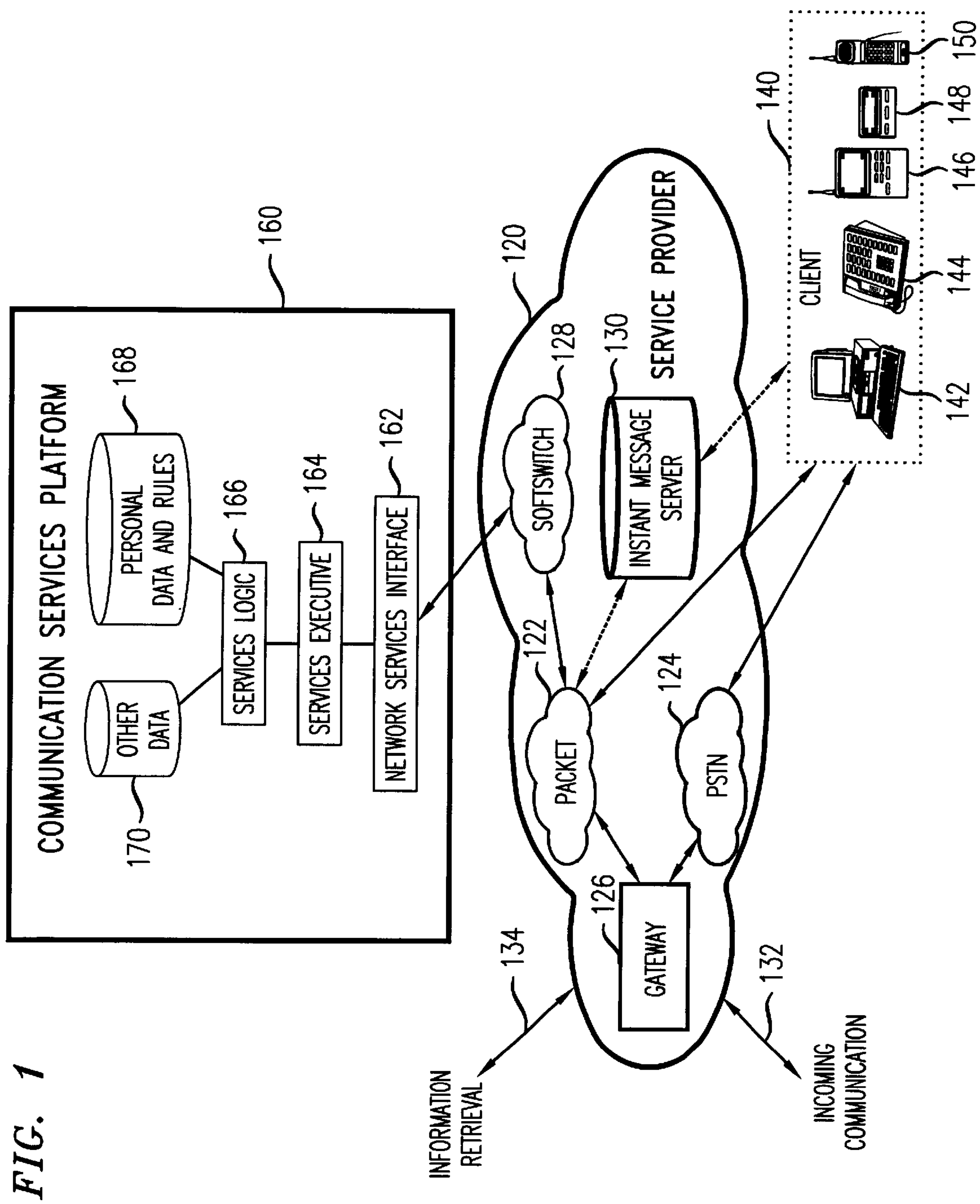
FIG. 1 is a block diagram illustrating an exemplary architectural configuration for practicing the principles of the present invention, with a network service provider also providing instant messaging service.
Figure 2:
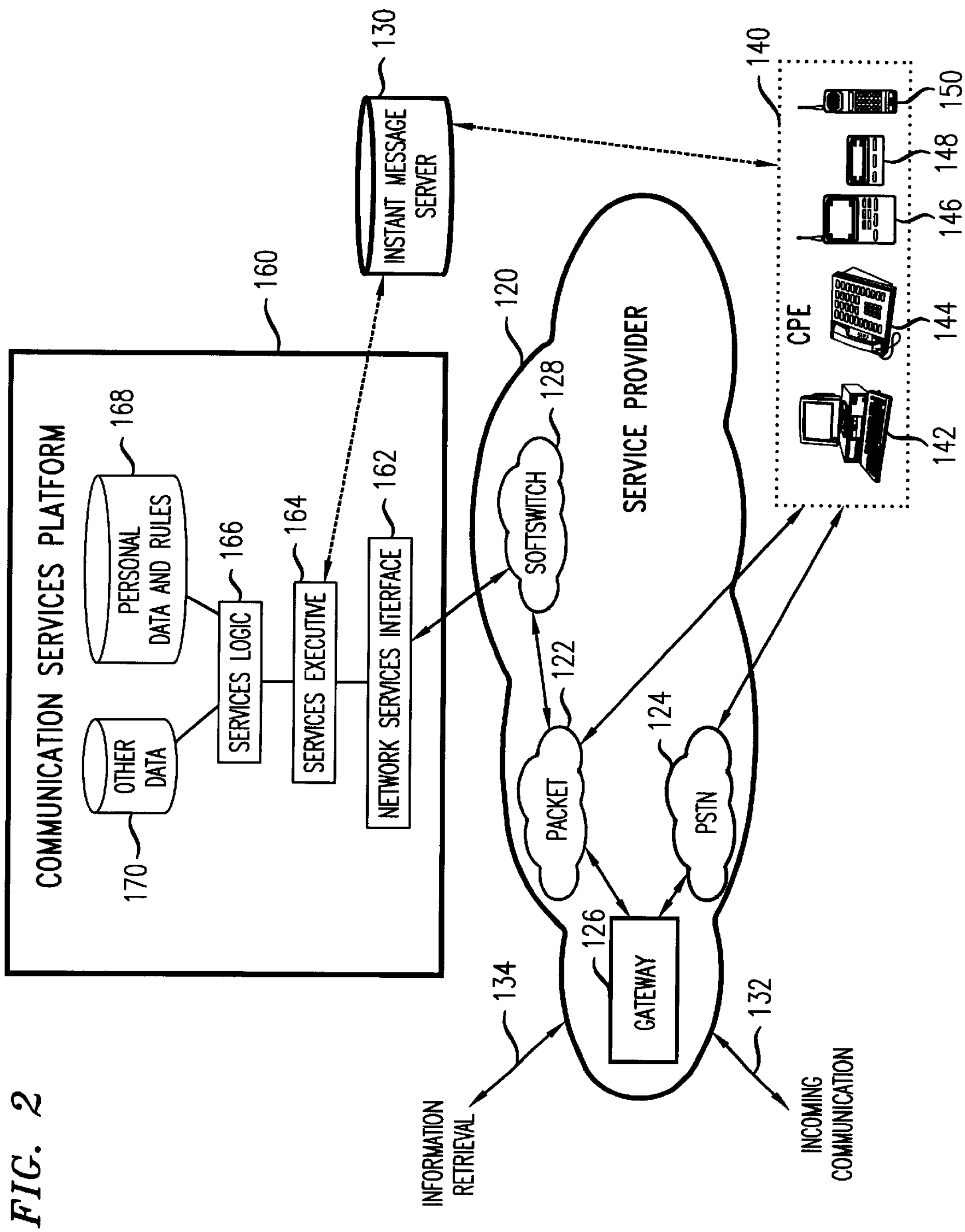
FIG. 2 is a block diagram illustrating an exemplary architectural configuration for practicing the principles of the present invention, with a service provider other than the network service provider offering instant messaging service.

FIGS. 1 and 2 are block diagrams illustrating exemplary architectural configurations for practicing the principles embodied in the present invention. A service provider 120 provides client access to one or more networks for communication and data exchange via a plurality of client premises equipment (CPE) 140. For example, the CPE 140 may include, but is not limited to, a client's personal computer (PC) 142, wired telephone 144 or screen phone, wireless cellular phone 150 or screen phone, wireless or wired personal digital assistant (PDA) 146 or other data or communication devices synchronized with a telephone or cellular phone, and/or a cable modem 148. The instant exemplary service provider 120 is shown providing both a Public Switched Telephone Network (PSTN) service and a packet-based service, such as an Internet access service, to the subscribing client's CPE 140. Communications and data are bi-directionally exchanged between the client's CPE 140 and the service provider via a PSTN switching module 124 and/or a packet routing/switching module 122. CPE equipment requiring a switched connection are typically connected through PSTN switching module 124, whereas CPE equipment transmitting packetized bits are typically provided network access by the service provider 120 through packet routing/switching module 122. The service provider 120, accesses the PSTN or Internet backbone for bidirectional information delivery/retrieval 134 and communications transmission 132 for a plurality of clients' CPE.

Figure 3:
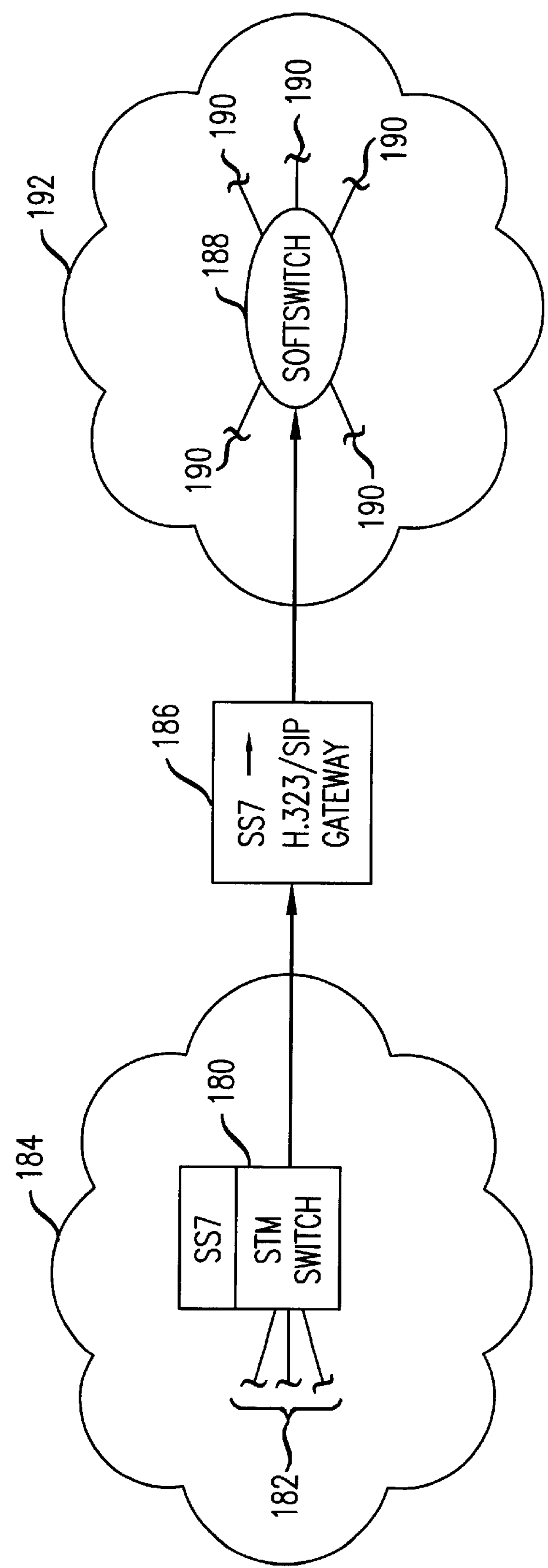
FIG. 3 is a block diagram illustrating an exemplary method for implementing conversion at a gateway device.

The service provider 120 may also provide means for converting received data and communication mode and channel, by utilizing a gateway 126. The gateway 126 is operable to convert digital bits representing a PSTN connected communication, packetize that data, convert to an appropriate protocol stack to support routing transmission over a packet network, and then forward the converted packets over the packet network. Such multi-mode and multi-channel service provisioning is well known in the art and is quickly becoming a ubiquitous service in today's consumer marketplace. By way of example and referring now to FIG. 3, a block diagram is shown for implementing such a conversion utilizing an interpretive gateway device for the purpose of Internet Protocol (IP) telephony. A plurality of circuit voice traffic connections 182 are conveyed over the PSTN backbone 184 via regular PSTN circuit switches (not shown) and terminate their PSTN transmission at a Synchronous Transfer Mode (STM) switch 180. Subsequent routing of this voice traffic is desired over the Internet backbone 192 to reach a desired destination.

Conversion from circuit voice traffic to an IP format occurs at a gateway 186. Gateways utilized for IP telephony are alternatively well known in the art as Service Access Concentrators or Internet Telephony Gateways. Circuit networks, such as PSTN networks 184, typically use Signaling System 7 (SS7) to communicate requests for connection set-up and teardown. IP endpoints and intermediate routers use ITU-T H.323 or Session Initiation Protocol (SIP) for session management. Therefore, gateway 186 uses a higher layer protocol to facilitate conversion in signaling mechanisms between the PSTN 184 and the IP network 192. In addition to conversion between circuit and IP formats, gateway 186 also provides voice compression, silence suppression, and other well-known functions needed on an application specific basis. The gateway then forwards the converted packets to an edge device IP router 188, for appropriate forwarding over one of the IP router ports 190, according to an internal routing algorithm or look-up table, and for transport over the Internet backbone 192 for delivery to the destination IP address.

Referring again to FIGS. 1 and 2, a Communication Services Platform (CSP) 160 is interfaced to the multiple network modes and channels via the service provider 120 through a service provider softswitch 128. A softswitch is a packet switch, well known in the art, which discerns network topology and sets up connections in the IP domain and in the PSTN domain through IP to PSTN signaling (e.g., SS7 signaling). The softswitch 128 routes applicable inbound calls to the user's service and service platform. The CSP 160 is a platform that is connected to the network with the ability to store and retrieve data from a database and process that data. One device on which a CSP 160 may be implemented is one or more workstations, although it would be apparent to those skilled in the art that any device having a data base adapted to store data in data fields and a microprocessor operable to retrieve, store, and operate on that data, could also be utilized. In one exemplary embodiment utilizing the principles comprising the present invention, the CSP 160 is owned and operated by the service provider 120. In an alternative embodiment, the CSP 160 is owned and operated by a third party to which the service provider has provisioned access. The service provider provides the interface between multiple networks and the CSP 160, thus allowing a client to maintain a continuous and locatable presence reachable from multiple networks for a subscribing client and the client's CPE 140. The CSP also performs execution logic and maintains data and preferences for each subscribing client.

An Instant Message (IM) system is utilized in conjunction with the architecture illustrated in FIGS. 1 and 2 to provide new and useful features and services for a subscribing client. FIGS. 1 and 2 are differentiated in the manner in which Instant Messaging is implemented. FIG. 1 shows an Instant Message (IM) server 130 operated and controlled by the service provider 120 and interposed directly between the subscribing client's CPE 140 and the packet routing/switching module 122. The IM server 130 interfaces with the Communication Services Platform (CSP) 160 through the packet routing/switching module 122.

FIG. 2 shows an IM server 130 outside of the service provider 120 domain. The IM server 130 interfaces with and services the client via the client's CPE 140 and the client's proxy presence within the Communication Services Platform (CSP) 160 via a Services Executive 164. In the embodiment illustrated in FIG. 2, the IM server is a third party server, maintained and operated by a third party provider. The client is registered with both the third party provider for the Instant Message service and with the service provider 120 for data and communication access over multiple networks. The Instant Message (IM) server 130 may be implemented as a stand-alone service provided by the third party provider, or in the alternative, may be incorporated within the Communication Services Platform (CSP) 160, in which case a single third party provider provides the services and features associated with both the CSP 160 and the IM server 130.

Referring once more to both FIGS. 1 and 2, the Instant Message (IM) server 130 utilized is an industry standard IM server using standard IM server software. Although additional advantageous features and services are derivable from modest IM server modification, as is subsequently described, the principles of the present invention are enabled by combining the services and features of the standard IM server with the unique features and services provided by the Communication Services Platform (CSP) 160. The CSP 160 is registered with the IM server as a "buddy" to the subscribing client. In accordance with the principles of the present invention, the location of a subscribing client (that is, a client subscribing to both the IM service and the multiple network access provided by the service provider 120) is located by the CSP 160, the CSP initiates communications to the subscribing client via instant messages, and the CSP solicits a response from the subscribing client.

The Communication Services Platform (CSP) 160 interfaces with the multiple networks made accessible by the service provider 120 utilizing a network services interface 162. The network services interface 162 is utilized to provide a signaling and transport interface with at least one of the networks accessible via the service provider softswitch 128. Typically, this interface utilizes packetized data bilaterally transmitted between the network services interface 162 and the packet routing/switching module 122, although such an arrangement is not required. Alternatively, the network services interface 162 may access the PSTN switching module 124 directly; or the network services interface 162 may be utilized to provide a signaling and transport interface with both the packet routing/switching module 122 and the PSTN switching module. In the embodiment in which the network services interface 162 directly interfaces with both the packet and PSTN networks, there is no need for signaling, conversion and transport across the packet and PSTN networks, therefore, the earlier described gateway 126 may be eliminated.

A services executive 164 is bi-directionally interfaced with the network services interface 162. The services executive 164 constructs services by reacting to triggering events as they are detected by the network services interface 162. For example, say a client subscribing to the Communication Services Platform with Instant Messaging Service has an incoming voice call. The incoming call is directed to the client's Communication Services Platform. The services executive 164 directs the network as to how it should proceed with the voice call. The services executive 164 maintains a plurality of rules and real term events which may, for example, direct the network services interface 162 to complete the voice call to a particular phone number, or it may determine that the voice call should be directed to a particular e-mail address, or it may determine that the voice call should be placed on hold while attempts are made to locate the present location and interface over which the client may be reached.

Services logic 166 is bi-directionally interfaced with the services executive 164 and determines which services are performed by the services executive 164 for a particular triggering event detected by the network services interface 162. That is, the services executive 164 is adapted to maintain the capability to perform various services and functions and the services logic 166 directs the services executive 164 as to which service or function to implement given a specific detected event. Together, the services logic and services executive are referred to as a services processor. The determinations made by the services logic 166 are made by referring to data bases 168, 170 which store a set of individual client data, rules, and personal preferences. The data bases 168, 170 are shown as divided into two specific databases; a personal data and rules database 170, and an other data database 170. The personal and rules database 168 contains data pertaining to an individual client. Such data may include, but is not limited to, information and personal preferences such as: the client's phone numbers, the client's Internet addresses, the client's personally defined "buddy list", a personal definition of varying priority assigned to respective "buddies" included in the "buddy list", and keywords which if included in data, a message, or a communication determine the priority or importance of that data, message, or communication. The personal data and rules database 168 also maintains the online status and location of the client, if known. The other data database 170 includes support data for the Communication Services Platform 160 and may include data associated with other "buddies".

Figure 4:
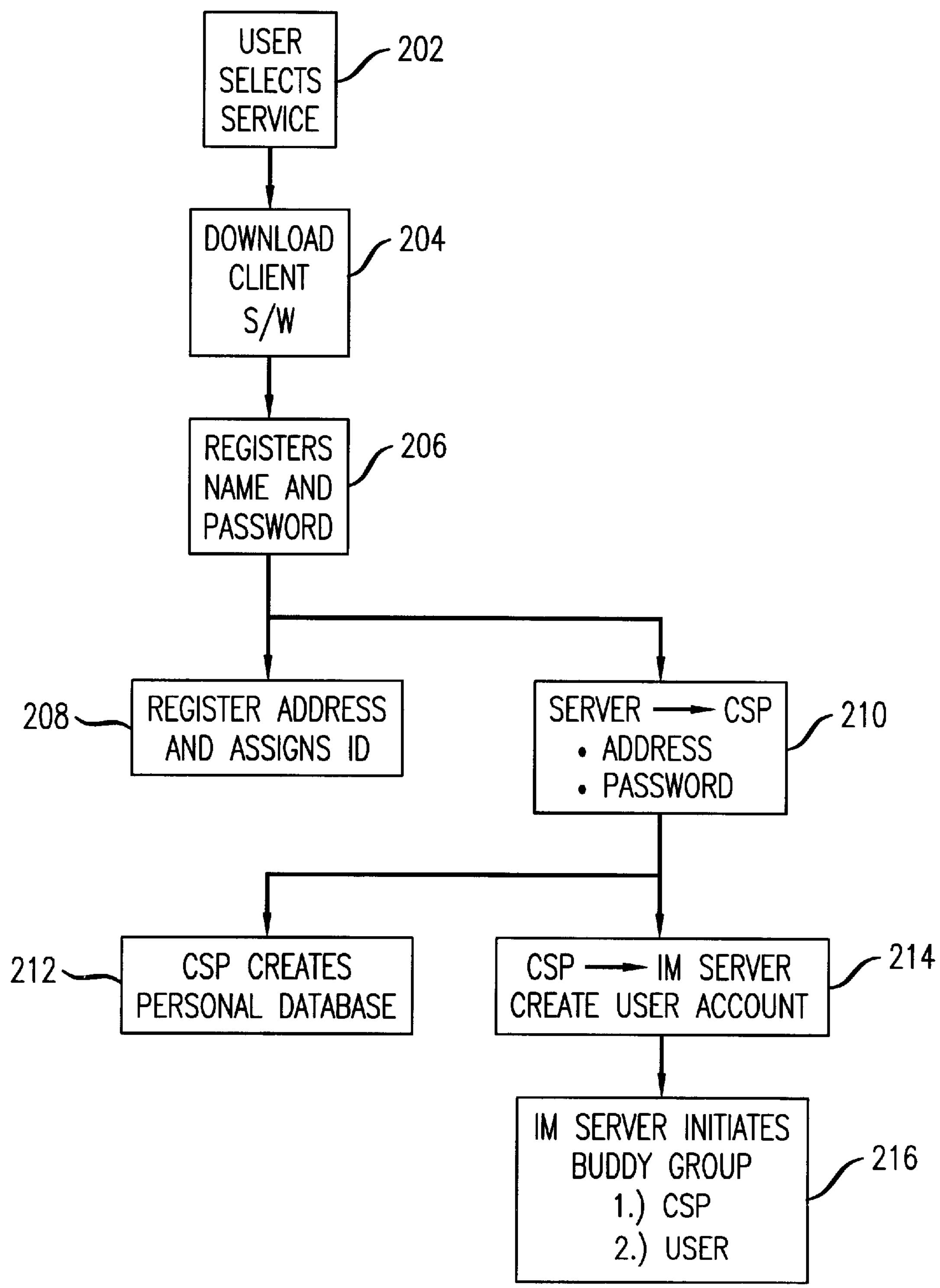
FIG. 4 is a flow diagram of an exemplary method utilized to provision a new user in accordance with the principles of the present invention.

FIG. 4 is a flow diagram of an exemplary method utilized to provision a new user in accordance with the principles of the present invention. The three components provisioned are the user's client premises equipment (CPE), the Communication Services Platform (CSP), and the Instant Message (IM) server. In accordance with step 202, a prospective user first contacts the service provider to obtain integrated IM service. The user is prompted for and selects a password. The selected password is entered into the provisioning server database; either by a customer service representative or through any well-known automated user interactive interface process. Other required administrative and account information is also exchanged at this time.

In accordance with step 204, the user is provided with provisioning software for use with his CPE. The user installs the provisioning software onto his CPE device(s). The user connects and registers, via his CPE, to the provider's secure provisioning server by entering his selected password, when prompted, in accordance with step 206. The provisioning server, in accordance with step 208, registers the address of the user's Instant message server and provisions the client CPE software with a unique identification (ID). In accordance with step 210, the provisioning server additionally conveys a copy of the user address and password to the Communication Services Platform (CSP). The CSP creates personal and administrative databases for the new user, in accordance with step 212. The CSP also conveys the unique ID created per step 208 to the IM server, creating a new IM account for the user in accordance with step 214. The IM server creates an initial buddy group for the user, which includes the user's CPE and CSP identity, in accordance with step 216.

Figure 5:
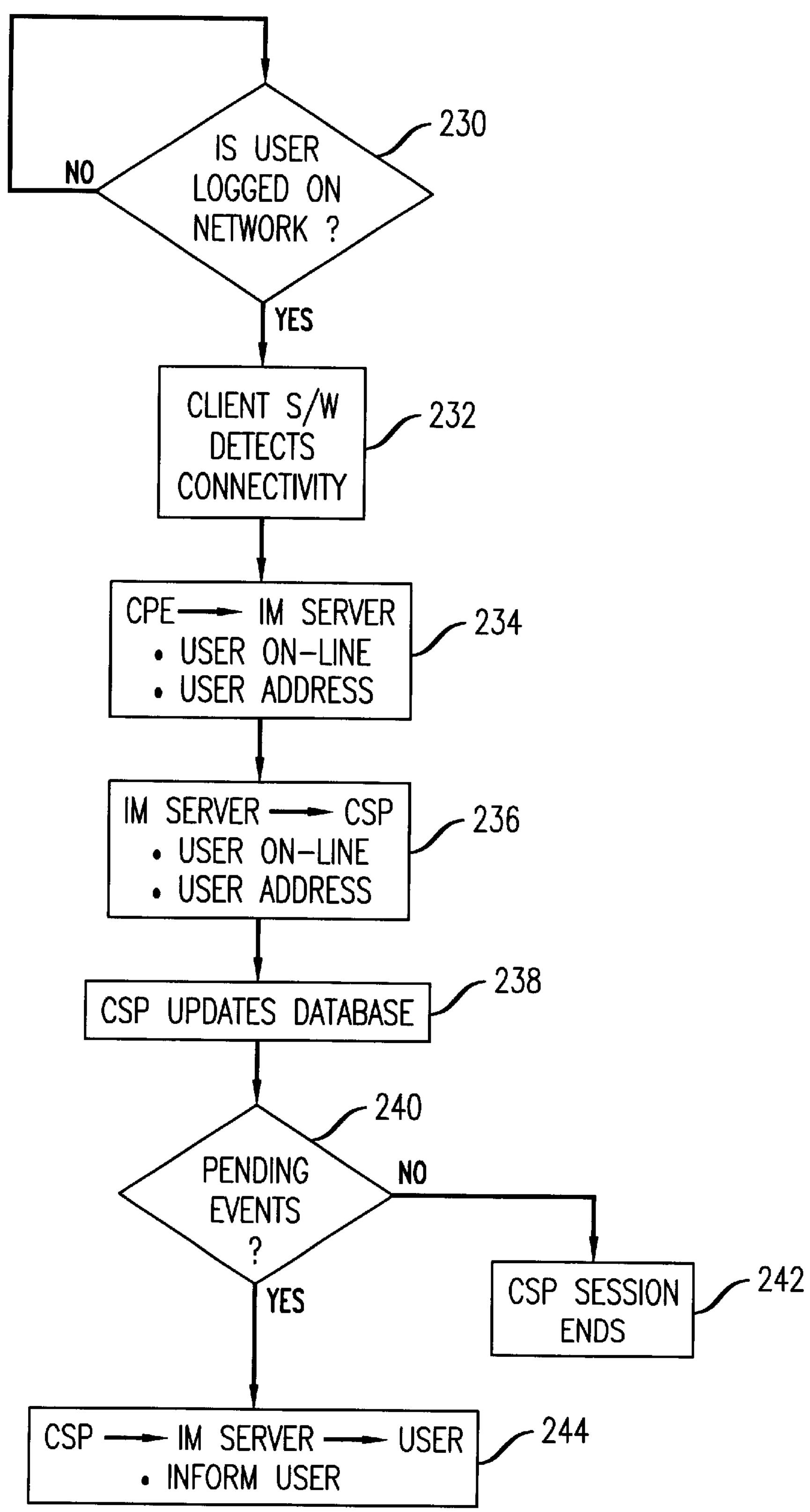
FIG. 5 is a flow diagram of an exemplary method utilized to communicate user's initial network use to the Communication Services Platform (CSP), in accordance with the principles of the present invention.

FIG. 5 is a flow diagram of an exemplary method utilized to communicate user's initial network use to the Communication Services Platform (CSP), in accordance with the principles of the present invention. In accordance with step 230, assume that the user initially logs onto the network utilizing one of user's client premises equipment (CPE) devices. The client software installed on the accessing CPE device detects network connectivity, in accordance with step 232. The client CPE software generates a message indicating user's online status and current user address, and in accordance with step 234, conveys the message to the Instant Message (IM) server, indicating the user's online presence and address. For example, if the CPE device that a user is utilizing is a packet device, then the packet address to which the CPE device is attached is provided. Alternatively, if the CPE device is one which accesses a PSTN network, then the PSTN exchange number is provided. The IM server then notifies the CSP of the user's online presence and address, in accordance with step 236. The IM server also notifies selected buddies to the user of the users presence online. In step 238, the CSP updates the CSP database to indicate that the user is online, which CPE device the user is utilizing to access the network, and the address to which the CPE device is attached.

Upon receiving notification of the user's presence online, the CSP checks for pending events, in accordance with step 240. Pending events include any outstanding data, communication, or notification received and held in abeyance during that time period for which the user had been off-line or inactive. Examples of pending events may include, but are not limited to, e-mail messages, voice mail messages, a log of attempted call connections while off-line, status of selected buddies as identified by the user, delivery of webpages or other packetized information either specifically requested by the user or returned as a result of predefined keyword search parameters, or communications with a proxy of the user (if enabled by the user). If the CSP has no pending events, then the CSP instant messaging session is terminated in accordance with step 242, but the user's online status is maintained by the CSP database and IM server. If the CSP does have pending events for the user, then the IM server sends an instant message communicating the event and eliciting a user response to the client CPE device, in accordance with step 244.

Figure 6:
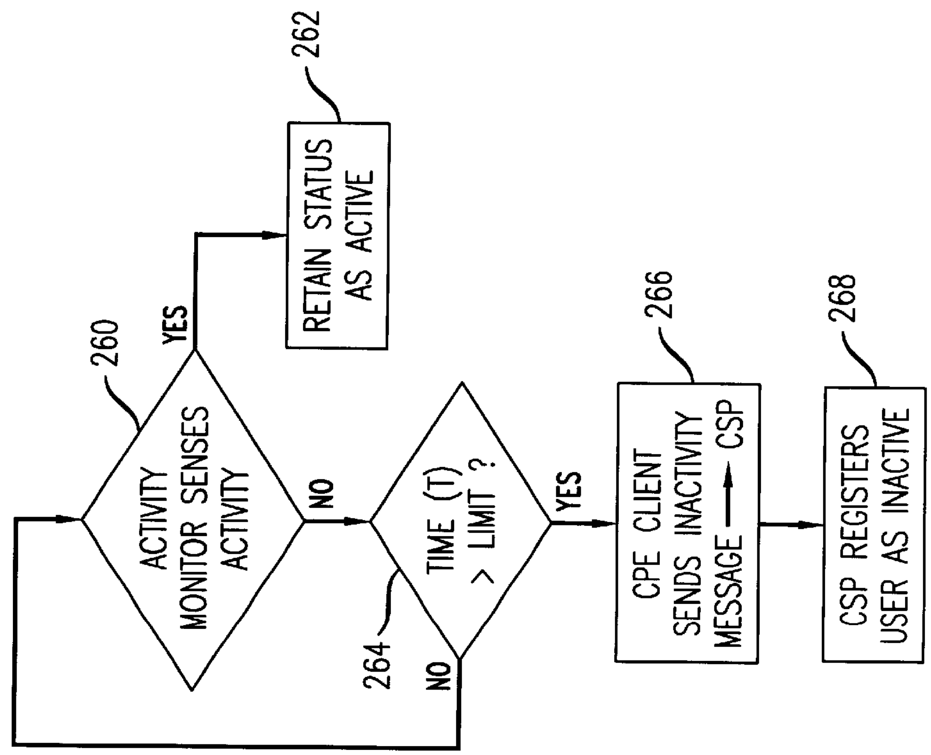
FIG. 6 is a flow diagram of an exemplary method utilized to communicate to the Communication Services Platform (CSP), a user's inactivity while utilizing a client premises equipment (CPE) device registered as online, in accordance with the principles of the present invention.

FIG. 6 is a flow diagram of an exemplary method utilized to communicate to the Communication Services Platform (CSP) a user's inactivity while utilizing a client premises equipment (CPE) device registered as online, in accordance with the principles of the present invention. This feature may also be implemented in the client CPE software and is utilized to determine when the user is inactive for a predetermined period of time, and therefore possibly away from a CPE device which is registered as online. In step 260, the CPE device continuously monitors for user interaction with a user interface of the CPE device and relays changes in state with the server. Interaction with a CPE device may be detected via several alternative methods, such as detecting when a user is actively typing on a keyboard, or via a motion detector associated with a mobile device. If interaction with a user interface of the CPE device is sensed, and the previous state was inactive, then the CPE device generates an active message and conveys the active message to the CSP via the Instant Message (IM) server, in accordance with step 262. If no interaction with a user interface is sensed during an activity monitor check, then in accordance with step 264, the time from last activity (T) is compared to a specified inactivity time limit (LIMIT). If time T is less than or equal to LIMIT, no immediate action is taken and the activity monitor continues to monitor for user interaction with a user interface, in accordance with step 260. If, however, time T becomes greater than LIMIT, then in accordance with step 266 the CPE device generates an inactivity message and conveys the inactivity message to the CSP via the IM server. Upon receiving the inactivity message, the CSP updates its database to indicate that the user is inactive.

Figure 7:
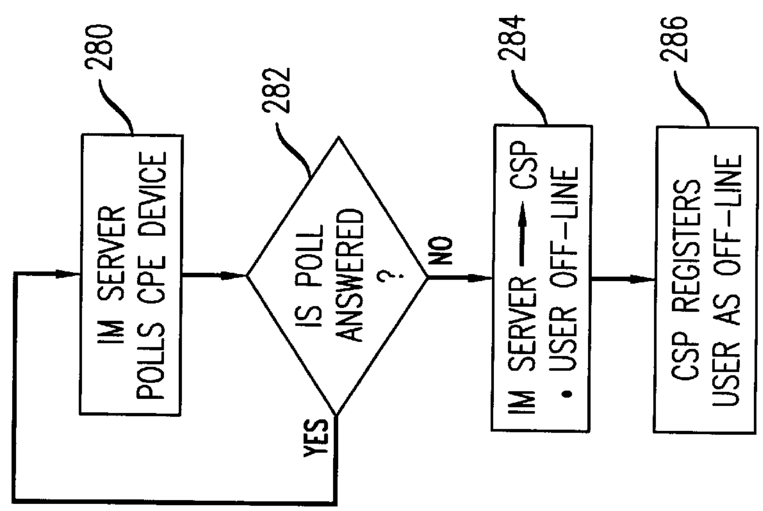
FIG. 7 is a flow diagram of an exemplary method utilized to determine termination of a network session and update a Communication Services Platform (CSP) database, in accordance with the principles of the present invention.

FIG. 7 is a flow diagram of an exemplary method utilized to determine termination of a network session through lack of network connectivity or disabling of the device, either intentionally or unintentionally, and update a Communication Services Platform (CSP) database, in accordance with the principles of the present invention. During the time period in which a user is maintained as online by the CSP database, the Instant Message (IM) server periodically polls the client premises equipment (CPE) to determine whether a network session has been terminated, in accordance with step 280. Session termination encompasses any loss of connectivity including but not limited to, the user initiated termination as a result of logging off, a service provider initiated termination, and a loss of a physical, link, and/or transport layer connection. If online, the polled CPE returns a poll response to the IM server in accordance with step 282 and the IM server determines that the user is still online. If however, no poll response is received by the IM server, then the IM server determines the user to be off-line. The IM server conveys an instant message to the CSP informing the CSP that the user's status has changed to off-line, in accordance with step 284. In an alternative embodiment of the present invention, the IM server also conveys instant messages to one or more predetermined buddies of the user to indicate the off-line status of the user. In accordance with step 286, the CSP database is updated to reflect the off-line status of the user.

Figure 8:
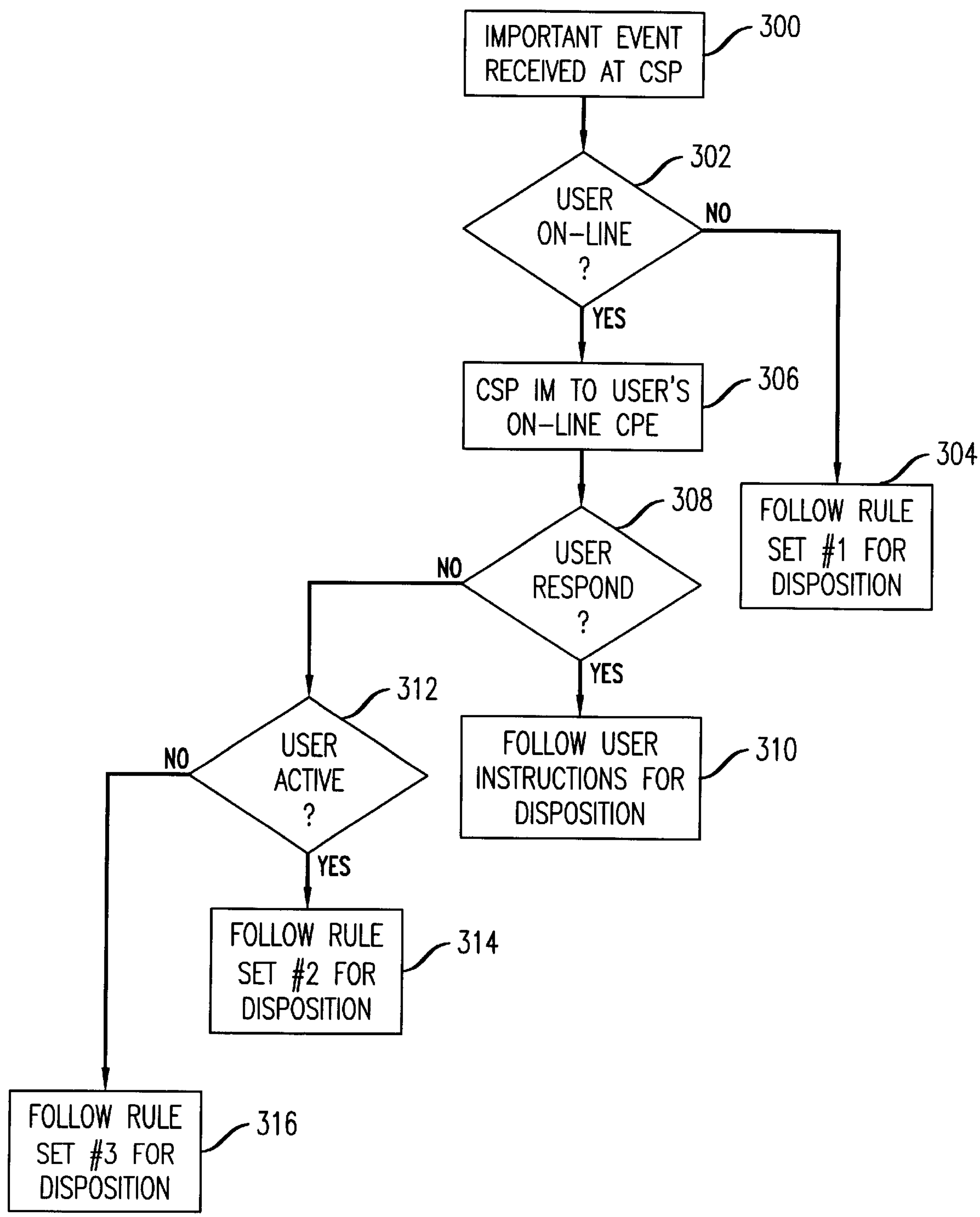
FIG. 8 is a flow diagram of an exemplary method utilized to determine the disposition of data or communications by the Communication Services Platform (CSP), in accordance with the principles of the present invention.

FIG. 8 is a flow diagram of an exemplary method utilized to determine the disposition of data or communications by the Communication Services Platform (CSP), in accordance with the principles of the present invention. In accordance with step 300, an important event is received by the user's proxy at the CSP. Important events include any data, communication, or notification received for the user at the CSP which the CSP rules database has classified as an important event. The CSP rules database for classifying an event as an important event may be personalized by the user so that specific sources, topics, or keywords elevate a communication to important event status. Examples of important event types may include, but are not limited to, e-mail messages, voice mail messages, a log of attempted call connections while off-line, status of selected buddies as identified by the user, delivery of webpages or other packetized information either specifically requested by the user or returned as a result of predefined keyword search parameters, or communications with a proxy of the user (if enabled by the user). In accordance with step 302, once a user defined important event is received by the user's proxy at the CSP, the CSP performs a check to determine whether the user is registered online, and if so, which CPE device the user is using and the user's address.

If the CSP database returns the result that the user is off-line, then the CSP determines an alternate disposition for the initiating important event, according to a first rule set maintained for the user in the CSP database, in accordance with step 304. The first rule set, for example, may direct the CSP to attempt to locate the user via automated calls according to a predefined schedule hierarchy. In an embodiment of the present invention, Instant Messaging may be utilized to locate the user via registered CPE devices which are online, but which show no current user activity. If the user is located, determined by the users response to a CSP query, then the user is notified that an important event has been received and the CSP initiates an instant message to the user to elicit the user's instructions for delivery of the content of important event. In the alternative, the first rule set may direct the CSP to hold the important event in abeyance as a pending event (previously described). The CSP then initiates an instant message to the user only when the status of the user is once again registered as online, informing the user that a pending event is awaiting disposition.

If the CSP database indicates that the user is online, however, then the CSP initiates an instant message, via the IM server, to the user's online CPE, in accordance with step 306. The conveyed instant message notifies the user that the CSP has received an important event and queries the user as to the method of disposition of the important event (that is, if the user wishes the contents of the important event forwarded, when the user wishes that content forwarded, and in which format the content should be delivered). In accordance with step 308, if the user responds to the CSP, then an instant message detailing the instructions for disposition and delivery from among the various offered options is generated and delivered to the CSP. The CSP, in accordance with step 310, then follows the requested instructions for disposition of the important event. If however, the user does not respond to the CSP notification and query, then the CSP checks whether the user is registered as active, in accordance with step 312. If active, then the CSP determines an alternate disposition for the initiating important event, according to a second rule set maintained for the user in the CSP database, in accordance with step 314. If inactive, then the CSP determines an alternate disposition for the initiating important event, according to a third rule set maintained for the user in the CSP database, in accordance with step 316. Individual rule sets are flexible in that either a set of default rules or a set of user defined rules may be selected to handle disposition of important events. In one embodiment of the present invention, the user may establish rules in which important events are disposed of differently based only upon the type of important event. As an illustrative example, the user may define rules in which the CSP attempts to locate the inactive user if a voice call or e-mail is received, but hold the important event as a pending event (rather than attempt to locate the inactive user) should a fax or pushed web page be received.

FIG. 9 is a flow diagram of an exemplary method for maintaining a continuous user network presence for defined buddies utilizing a Communication Services Platform (CSP) and instant messaging, in accordance with the principles of the present invention. Buddies of the user are also registered with the CSP and the IM server. In accordance with step 330, a user creates buddy groups and defines specific attributes to associates (or buddies) included within each group. The specific attributes defined include information relating to the buddy's client premises equipment (CPE), such as the buddy's Internet address, wired telephone number, cellular phone number, facsimile number, and other data and communication CPE device numbers and addresses. In accordance with step 330, the user assigns and defines each buddy's priority. In the instant embodiment of the present invention, a buddy's priority is classified as being one of three priority levels; low, high, or highest. The assigned buddy attributes and priority classifications are stored for the user within the CSP database.

Advantageously, by providing means to assign a buddy priority to individual buddies or groups of buddies, the user maintains control of his privacy with respect to his online location, presence, and activities. For example, a buddy may be assigned a high priority by the user, in accordance with step 332. In accordance with step 334, a buddy who is assigned a high priority and who has at least one piece of provisioned CPE that is online and active, will be notified via the IM server of the user's "real presence" when the user accesses the network via any of his provisioned CPE. This notification is similar to that currently provided by service providers within buddy groups. That is, when the user is online in accordance with step 336, all others who have identified the user as a buddy are notified of the user's presence, per step 340. The user's real presence is therefore advertised to others who have identified the user as a buddy. However, when the user is off-line, all others who have identified the user as a buddy are notified that the user is not online and is not available.

However, an embodiment of the present invention expands the concept of buddy notifications. For example, the user may define a buddy as a low priority buddy. In accordance with step 342, the Communication Services Platform (CSP) accesses its database to determine the assigned priority. In accordance with step 344, if the buddy has been assigned a low priority by the user, then the buddy will be always discern the presence of a user's proxy. The buddy, however, will not be able to determine the "real presence." That is, the proxy will always appear available to the buddy, whether or not the user is online or off-line. The buddy may communicate and interact via the user's proxy residing in the CSP database. In accordance with step 346, the user defined rule base residing in the CSP determines how to process the received data or communication and how and when to notify the user of the received data or communication. In essence, the CSP acts as a privacy filter to those buddies and sources that the user has classified as low priority. The user may define varying rules for CSP treatment depending on whether the user is online or off-line, or depending upon the type of data or communication received. For example, if online, the user may be supplied with an IM screen pop informing him of a received communication with particular information pertaining to the communication such as the sending source or buddy, the subject, time received, etc. The user is offered various options, such as immediately forwarding the communication, choosing the CPE device over which the communication delivery is desired, and/or saving the communication for later retrieval. If the user is off-line, the CSP is provisioned to process received data or communications via a second set of user defined rules, which may include attempting to contact and notify the off-line user via CPE. However, completely independent of the user's activity or presence online or off-line, the buddy is aware only that users proxy is continuously available, shielding the user's activity.

In accordance with step 348, the user has defined a buddy as a highest priority buddy. A highest priority buddy accessing provisioned CPE will be given access and information pertaining to the user's location, status, and activities greater than either the low or high priority buddy. The CSP first accesses the CSP database to determine whether the user is online or off-line, in accordance with step 350. If the user is online via any provisioned user CPE, then the users proxy is registered as being off-line, in accordance with step 352. Rather, the buddy is notified of the user's real presence online in accordance with step 354. Notification of the CPE device on which the user is currently registered online may also be forwarded to the buddy, to aid the buddy in determining the appropriate time, means, and method for contacting the user should such action be desired. If however, the user is off-line, then the user's proxy is registered as being online, in accordance with step 356. In accordance with step 358, the buddy may communicate and interact via the user's proxy residing in the CSP database. In accordance with step 360, the user defined rule base residing in the CSP determines how to process the received data or communication and how and when to notify the user of the received data or communication.

Advantageously, the use of an intelligent Communication Services Platform (CSP) integrating instant messaging within a unified messaging platform, in accordance with the principles of the present invention, enables delivery of unique and robust features and services. The description of such features and services here is intended as merely illustrative and not exhaustive. For example, the previously described activity monitor may be utilized to register a user's location at a CPE device. Automated instant messaging containing user location and activity information may be utilized to advertise the user's presence and availability to selected buddies, groups, and associates. The extension of instant messaging to non-PC devices enables a more robust structure for instant messaging notification and data and communication exchange. Instant messages may be utilized as screen pops to deliver information to the user regarding data or communications received by the CSP prior to connection or delivery. Choices regarding the connection or delivery of data or communications are offered to the user via instant messages. The user may instant message his choices to the CSP in return. Key word search engines are implemented at the CSP to create a web page retrieval filter and to provide Universal Resource Locator (URL) pushes to display that information. Supporting information pertaining to a collaborative communication may be pushed through screen pops or URLs from external databases. to Communications may be forwarded via several communication channels (e.g., Additionally, the present invention allows for a high degree of control to be retained by the user, through the use of instant messaging, to direct delivery of data and communications. For example, upon notification of a pending event or received data or communications by the Communication Services Platform (CSP), the user may select the delivery channel utilized (i.e., packet or PSTN service), the user may elect to reject the data or communication, the user may elect to have the data or communication forwarded to a messaging system or to a third party, and/or the user may elect to conference parties in or to make new calls.

The foregoing description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the line represent various processes which may be substantially represented in computer readable medium and so executed by a computer or processor, whether or not such computer or processor is explicitly shown.

The functions of the various illustrated or described elements, including functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method of assigning associate priorities, for an associate of a communications services platform (CSP) user, within a user-definable instant messaging buddy group, said method comprising the steps of:

receiving, from said CSP user, a selection assigning a priority level for said associate;

storing said priority level for said associate in a preference database;

detecting an attempt by said associate to establish contact with said CSP user;

providing said associate, responsive to said attempt by said associate to establish contact with said CSP user, with a first quantity of information pertaining to a CSP user status, when said priority level is assigned as a first priority level; and providing said associate, responsive to said attempt by said associate to establish contact with said CSP user, with a second quantity of information pertaining to said CSP user status, when said priority level is assigned as a second priority level.

2. The method in accordance with claim 1 wherein said first quantity of information includes only information pertaining to a proxy of said CSP user, regardless of whether said CSP user is online or offline.

3. The method in accordance with claim 2 wherein said first priority level is defined as a low associate priority level.

4. The method in accordance with claim 1 wherein said second quantity of information includes a notification to said associate indicating when said CSP user is online.

5. The method in accordance with claim 4 wherein said second priority level is defined as a high associate priority level.

6. The method in accordance with claim 4 wherein said first quantity of information includes information pertaining to a proxy of said CSP user when said CSP user is offline.

7. An instant messaging server, said instant messaging server operable to assign associate priorities, for an associate of a communications services platform (CSP) user, within a user-definable instant messaging buddy group, said instant messaging server comprising:

means for receiving, from said CSP user, a selection assigning a priority level for said associate;

means for storing said priority level for said associate in a preference database;

means for detecting an attempt by said associate to establish contact with said CSP user;

means for providing said associate, responsive to said attempt by said associate to establish contact with said CSP user, with a first quantity of information pertaining to a user status, when said priority level is assigned as a first priority level; and means for providing said associate, responsive to said attempt by said associate to establish contact with said CSP user, with a second quantity of information pertaining to said CSP user status, when said priority level is assigned as a second priority level.

8. The instant messaging server in accordance with claim 7 wherein said first quantity of information includes only information pertaining to a proxy of said CSP user, regardless of whether said CSP user is online or offline.

9. The instant messaging server in accordance with claim 8 wherein said first priority level is defined as a low associate priority level.

10. The instant messaging server in accordance with claim 7 wherein said second quantity of information includes a notification to said associate indicating when said CSP user is online.

11. The instant messaging server in accordance with claim 10 wherein said second priority level is defined as a high associate priority level.

12. The instant messaging server in accordance with claim 10 wherein said first quantity of information includes information pertaining to a proxy of said CSP user when said CSP user is offline.

* * * * *